April 17, 1962 W. E. MARTIN 3,030,126
LATCHING TRAILER GOOSENECK
Filed Aug. 7, 1958 5 Sheets-Sheet 1
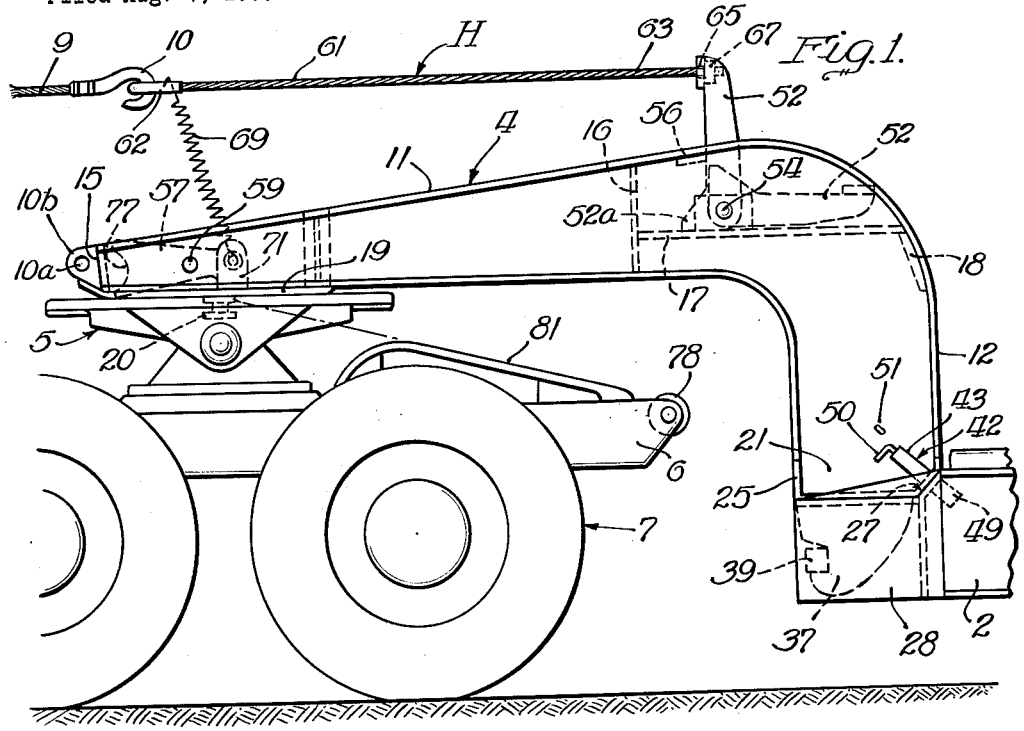
INVENTOR:
William E. Martin
BY
Eberhard E. Wolter
Atty.

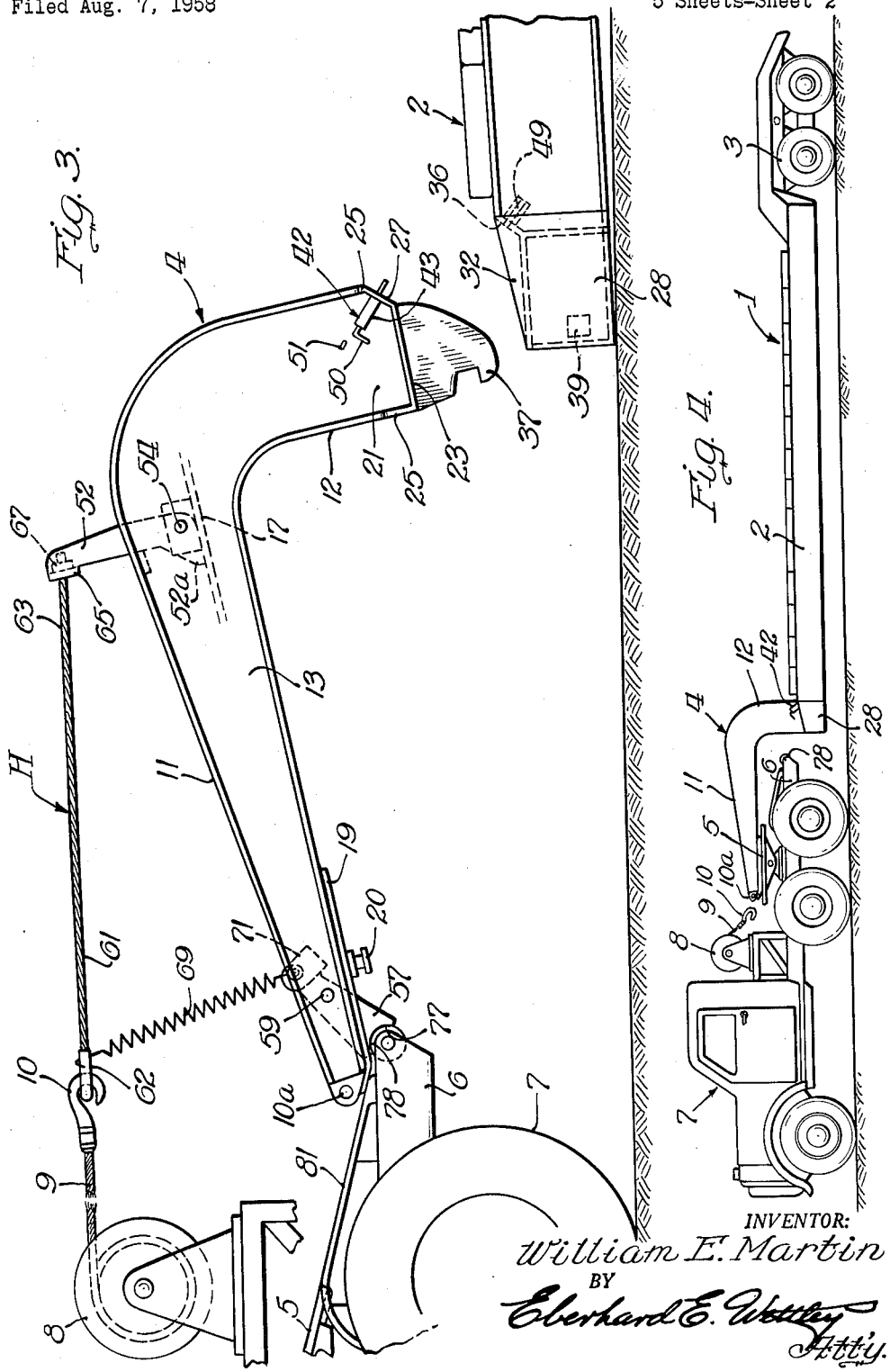

April 17, 1962 W. E. MARTIN 3,030,126
LATCHING TRAILER GOOSENECK
Filed Aug. 7, 1958 5 Sheets-Sheet 3
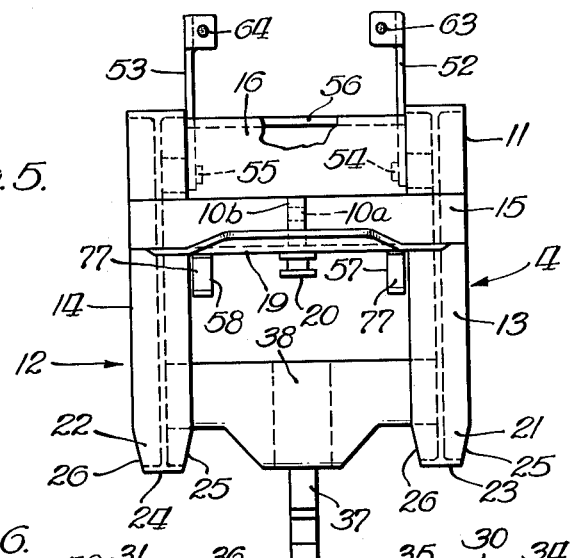
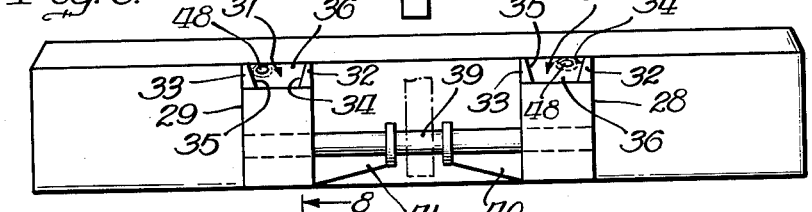
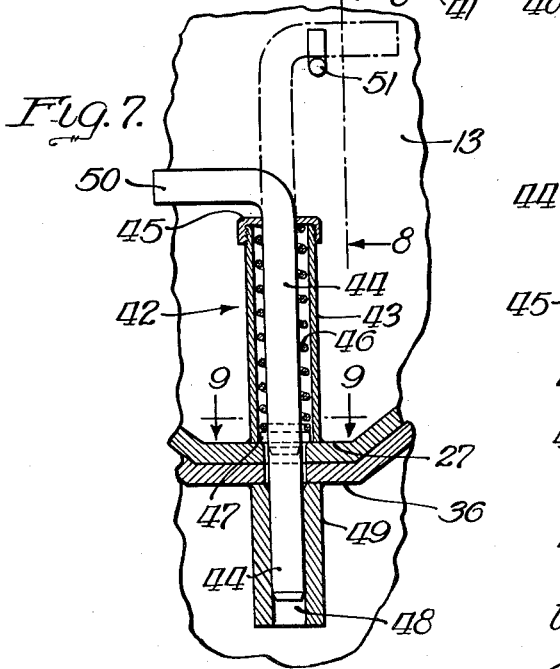
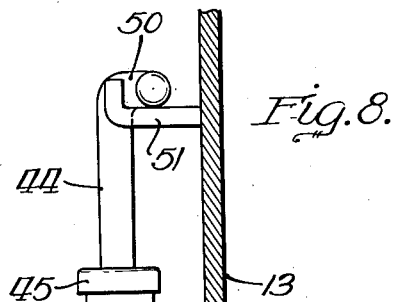
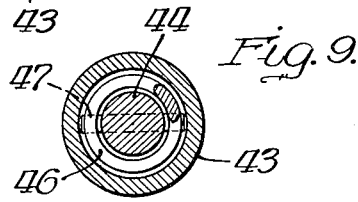
INVENTOR:
William E. Martin
BY
Eberhard E. Whatley
Att'y.

April 17, 1962 W. E. MARTIN 3,030,126
LATCHING TRAILER GOOSENECK
Filed Aug. 7, 1958 5 Sheets-Sheet 4
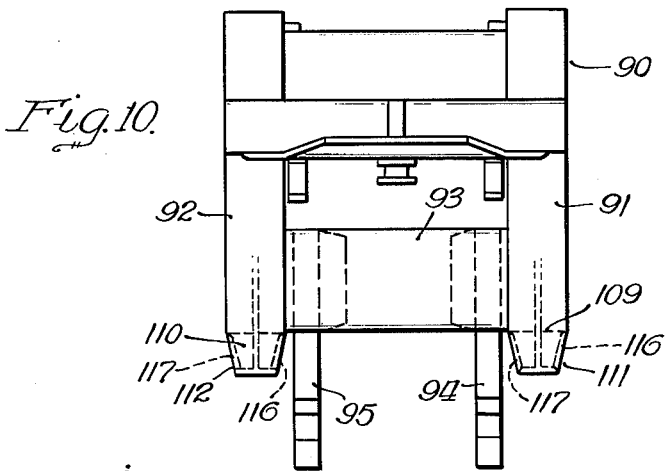
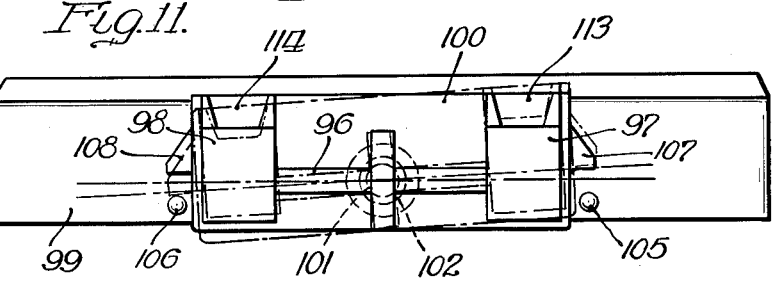
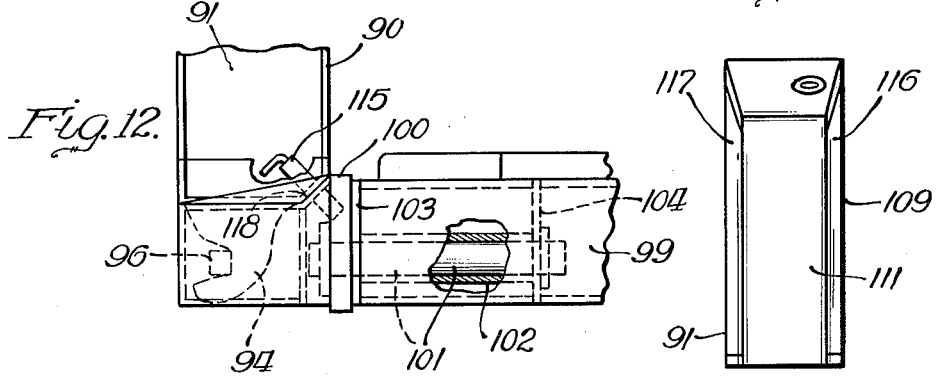
INVENTOR:
William E. Martin
BY
Eberhard E. Whitley
Atty.

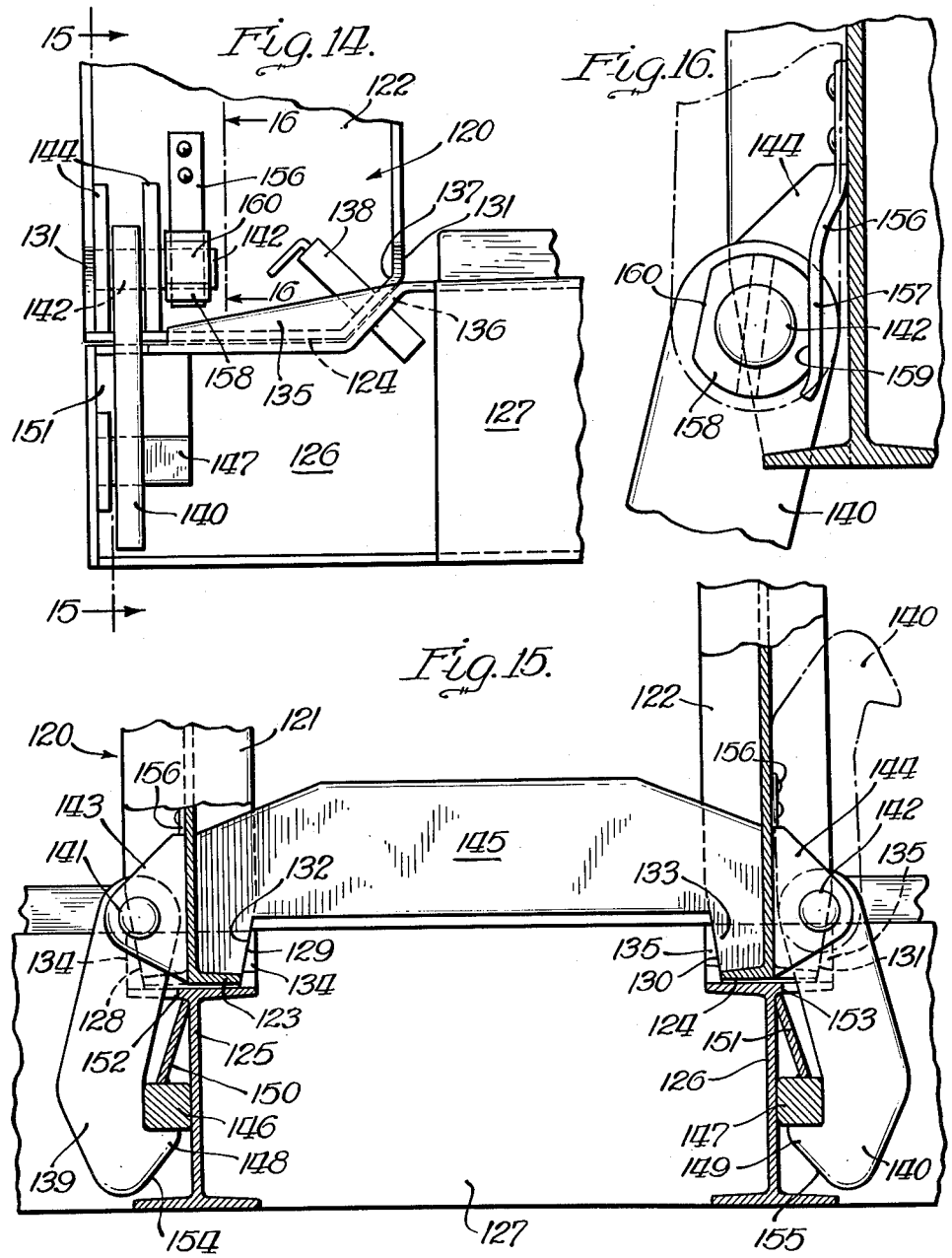

3,030,126
LATCHING TRAILER GOOSENECK
William E. Martin, Kewanee, Ill., assignor to Hyster Company, Kewanee, Ill., a corporation of Nevada
Filed Aug. 7, 1958, Ser. No. 753,699
23 Claims. (Cl. 280—425)

This invention relates to a flat bed trailer of the gooseneck type.

More specifically, the invention is directed to a trailer that is provided with a detachable gooseneck. By removal of the gooseneck from the bed with the latter resting upon the ground, such a bed can be readily loaded or unloaded as the case may be. Under normal conditions of operation, the present gooseneck is constructed and arranged to be bodily manipulated by a tractor or towing vehicle to bring about the latching of the gooseneck to the trailer bed or in separating the gooseneck from the bed of the trailer.

It is one of the objects of the present invention, therefore, to provide a trailer as a composite vehicle comprising, in general, a load hauling bed or platform having a gooseneck that is adapted for connection with a towing vehicle or tractor for purposes of drawing the trailer bed, and wherein coacting means are embodied into the gooseneck and bed combination to permit the convenient and efficient bodily release of the gooseneck from the bed or vice versa.

Another object resides in the construction of the gooseneck per se and in the provision of several means for the bodily removal of the gooseneck from the bed with the aid of the towing vehicle or tractor. The gooseneck is made to receive its support entirely from the towing vehicle or tractor for manipulation independently of the bed of the trailer and relative to the road or ground.

A further object of the composite trailer of this invention is to provide gooseneck handling mechanism whereby the gooseneck can be readily manipulated by the operator of a towing vehicle or tractor into latching orientation with respect to a trailer bed or platform and to bring about the rigid connection between such composite units to pick up the adjacent end of the trailer bed to dispose such bed in a transportable position upon the usual running gear associated with the rear end of the bed.

As a further object, the gooseneck and bed include multiple point reactionary means that coact with a latching structure to efficiently and adequately stabilize the connected units with respect to each other to provide a sturdy assembly of such units.

Another object is the provision of orientation means and associated locking mechanism to hold the latched parts in operative relation.

A further object is the provision of a harness structure coacting with associated gooseneck parts that are all adapted for connection with cable or hoist means carried by the towing vehicle or tractor to manipulate the gooseneck.

The gooseneck is constructed for fifth wheel connection with a pulling vehicle and includes, as another object, appropriate abutment mechanism to automatically engage a chassis or other part of the pulling vehicle to establish a means to bodily fulcrum the gooseneck by means of the outer tongue end thereof.

Other objects relate to the provision of a number of coacting modified mechanisms that may be readily employed in a separable combination of gooseneck and bed structures to carry out the fundamental concept of the present invention and under several different operational and beneficial conditions.

Further objects and advantages relating to and inherent in the latching trailer gooseneck construction of this invention shall hereinafter appear or become evident from the following detailed description directed to the several forms of the invention that are illustrated by way of example in the accompanying drawings that form a part of this specification.

In the drawings:

FIG. 1 is a side elevational view of a fragmentary portion of the front end of a trailer incorporating the features of this invention with the trailer being shown in transportable position connected with a tractor fifth wheel;

FIG. 2 is a plan view of the gooseneck per se illustrated in FIG. 1;

FIG. 3 shows a side elevational view of the gooseneck and bed of the trailer in separated positions with the gooseneck being manipulated by and under full control of the tractor equipment through connection with the gooseneck harness structure;

FIG. 4 is a side elevational view diagrammatically illustrating a trailer of the present design connected with a tractor with all units of the trailer fixedly joined and disposed in transportable towing relation with a tractor;

FIG. 5 is a front end view of the gooseneck per se;

FIG. 6 is a front end view of the bed of the trailer as it appears with the gooseneck disconnected therefrom;

FIG. 7 is an axial cross sectional view of one of the locking mechanisms employed for coaction between the gooseneck and bed to keep the latter units latched in joined relation, this section being shown on a vertical axis for convenience of illustration;

FIG. 8 is a detailed cross sectional view taken along the line 8—8 in FIG. 7;

FIG. 9 is another detailed cross sectional view as taken along the line 9—9 in FIG. 7;

FIG. 10 is a front end elevational view of a modified gooseneck construction;

FIG. 11 is a front end elevational view of a modified trailer bed adapted for cooperation with the gooseneck shown in FIG. 10;

FIG. 12 is a fragmentary side elevational view of the members in FIGS. 10 and 11 as they appear in connected assembled relation;

FIG. 13 shows a bottom view of one of the gooseneck reactionary and orientation bases of the FIG. 10 construction;

FIG. 14 is a fragmentary side elevational view of another modified gooseneck and bed arrangement as the same appear in latched and operatively connected relation;

FIG. 15 is a transverse vertical cross sectional view of the connected gooseneck and bed as they appear substantially as viewed along the plane of the line 15—15 in FIG. 14; and FIG. 16 is another detailed cross sectional view taken substantially in the plane of the line 16—16 in FIG. 14 to illustrate further details of construction of this latter form of the invention.

Referring to FIGS. 1 to 9, the trailer 1 consists of a bed 2 supported upon a running gear 3 at its offset rear end and having an attached gooseneck 4 at its front end adapted for connection with a fifth wheel 5 mounted upon a chassis 6 of a towing vehicle or tractor 7 that provides a power operated winch 8 having a tow line or cable 9 terminating with an attachment hook 10.

The gooseneck 4 comprises a tongue section 11 and a contiguous attachment section 12, both sections being laterally outlined or defined by spaced L-shaped side frames 13 and 14 that are rigidly connected by suitable structural units including the cross members 15, 16, 17 and 18. A bearing plate 19 is secured to the forward underfaces of the tongue side frames and this plate rigidly carries a hitch pin 20 of a conventional design that latches into the fifth wheel 5 of tractor 7 as shown in FIG. 1.

The attachment section 12 of the gooseneck 4 is vertically arranged to offset the tongue section 11 above its terminal bottom or base portions 21 and 22 that provide spaced feet 23 and 24 as seat means to coact with and engage appropriate matching means situated on the trailer bed as will be hereinafter explained.

The feet 23 and 24 each include flanking tapered perimeter portions as best illustrated in FIGS. 1, 2, 3 and 5. Side tapered edges 25 and 26 on side frames 13 and 14 are joined by a rear sloping frame ledge 27, all providing surfaces leading upwardly and outwardly from the feet portions per se. The construction of the feet and base portions of side frames 13 and 14 thus provide spaced orientation means that function in abutting relation with the bed to serve as cooperative means to connect with the forward end of the bed as towing means.

Referring now to FIGS. 1, 3 and 6, the bed 2 may be of any conventional type having, however, a pair of extended structural projections as beams 28 and 29 that are integrally formed with the bed and which are spaced laterally for alignment with the gooseneck side frames 13 and 14. Each projecting beam or support 28 and 29 is provided with an internally tapered socket 30 and 31 to receive the pair of feet 23 and 24 of the spaced side frames 13 and 14. Each socket 30 and 31 opens outwardly forwardly of the beams and provides lateral side rails 32 and 33 having inner tapered walls 34 and 35 that connect with a forwardly and downwardly sloping rear wall 36 as best shown in FIGS. 3 and 6. Thus the corresponding matched tapered perimeter portions adjacent the feet 23 and 24 of side beams 13 and 14 are adapted for abutting socketed orientation and aligned connection with the bed beam projections 28 and 29. The sloping walls 34 and 35 of rails 32 and 33 provide the lateral alignment structure and rear wall 36 provides the proper fore and aft positioning of the attachment section 12 in relation to the trailer bed 2.

Supplementing the described structures, the gooseneck 4 and the bed 2 are equipped with latching mechanism comprising a fixed hook 37 secured to a suitable cross beam member 38 on the gooseneck 4 as shown in FIGS. 3 and 5, and a latch bar 39 is placed ahead of the bed 2 and spanning the space between the beams 28 and 29. The latch bar 39 is secured in fixed relation to the beams. Suitable reenforcing baffle members 40 and 41 as in FIG. 6 may be employed for greater stability and rigidity of bar 39 if desired.

With the described mechanisms, the gooseneck can be oriented and connected with the bed 2 under three points of operative contact, two points being located laterally to each side of the longitudinal vertical median plane of the trailer bed 2 and the third point coincident with respect to the median reference plane. When such mechanisms are operatively connected as shown in FIG. 1, it is further desirable to provide suitable locking mechanism to prevent accidental separation of the gooseneck and bed under all conditions of operation.

For this purpose, locking mechanisms such as 42 are provided at the outer sides on each side frame 13 and 14 for coaction with complemental means associated with each beam 28 and 29 of the bed. Mechanisms 42 are each of the character illustrated in FIGS. 7 to 9 and consist of a sleeve 43 secured to the sloping rear wall 27 of the foot portion of the side frame to accommodate a plunger 44 arranged for movement along the length of the sleeve. A cap 45 is screwed or otherwise secured to the free end of sleeve 43 and an expansion spring 46 is interposed between the cap 45 and a cross pin 47 carried by the plunger 44. Spring 46 acts to normally urge the plunger 44 outwardly of the sleeve 43 in a direction to enter the bore 48 of a sleeve 49 that is carried by the rear wall 36 of the beam projection on the bed, the sleeves being aligned for the purpose stated.

Release of the locking mechanism 42 is brought about by withdrawal of plunger 44 from sleeve 49 by means of handle 50. The latter may be turned on its axis to swing handle 50 over a hook 51 to hold the plunger 44 in completely retracted inoperative position with the coacting sleeve parts and their associated structures unlocked and free for separation.

The purpose of having a latching gooseneck on a flat bed trailer of the character described is to provide means to remove the gooseneck from the bed after the bed is placed in reclining position upon the road or ground to load or unload the equipment. The gooseneck is a heavy piece of mechanism and, therefore, requires special power means for appropriate handling. Such means has been incorporated into the latching gooseneck structure of the present invention and with the purpose of controlling the manipulations of the gooseneck to the extent that the latching and unlatching operations may easily be accomplished by an operator with the normal facilities provided by a towing vehicle or tractor.

As best illustrated in FIGS. 1, 2 and 3, the side frames 13 and 14 of the gooseneck 4 each carry rearwardly located anchor arms 52 and 53 that are pivoted at 54 and 55 to assume upright positions as in FIGS. 1 and 3, such positions being determined by a stop bar 56 connected between side frames 13 and 14 and/or by means of the arm feet 52a and 53a. Additionally, each side frame 13 and 14 carries a retractable forward fulcrum arm 57 and 58 respectively, which arms are pivoted at 59 and 60 as shown in FIGS. 2 and 3.

A harness arrangement H coacts with the side frame anchor arms and the fulcrum arms described. Such a harness H comprises a looped cable 61 providing an attaching eye 62 at its forward end, with the loose ends 63 and 64 of the cable being held through appropriate openings in the ears 65 and 66 of arms 52 and 53 by suitable securing collars such as 67 and 68. A pair of tension springs 69 and 70 are hooked through a suitable opening 62a in eye 62 and connected with headed pins on the respective weighted fulcrum arm tail pieces 71 and 72 to urge the fulcrum arms in counterclockwise directions as viewed in FIGS. 1 and 3 whenever the harness H is set up and arranged for operative connection with hook 10 of the cable 9 on the winch 8 of a tractor 7 all as best seen in FIGS. 1, 2 and 3.

While it would be easily possible if desired to provide the fulcrum arms 57 and 58 on the opposite outward faces of the side frames 13 and 14 of the gooseneck, these fulcrum arms as shown in FIG. 2 swing out through slots 73 and 74 in the bearing plate 19, and the ends of the slots 75 and 76 provide stop means to control the maximum outward rotation of the fulcrum arms under the action of their connected tension springs 69 and 70.

In the construction shown in FIGS. 1 and 3, the fulcrum arms 57 and 58 each have concave forward ends 77 to abuttingly engage a suitable roller 78 on the tractor chassis 6. This construction is so made for convenience and it should be understood that fulcrum arms such as 57 and 58 may use the same concave ends or be provided with ends of generally V configuration or of any analogous configuration to engage any kind of a structural chassis member such as an I-beam or a channel flange to function in an identical manner as do the concave arm ends and round roller 78 depicted in the drawings. The main consideration is to provide a fulcrum means at the head end of the gooseneck whereby the latter may be vertically rotated to elevate or lower its attachment section 12 and at the same time to provide laterally spaced abutment units to react against the tail end of the tractor chassis roller or frame to thus provide means to swing said gooseneck horizontally by selectively steering and running the tractor vehicle.

The attachment or detachment of the gooseneck is of course brought about by the cable and winch facility of the towing vehicle or tractor. When the trailer is in transportable condition as in FIG. 4, the anchor arms 52 and 53 are retracted as shown in broken lines in FIG. 1 and the looped cable 61 may be conveniently stowed in the gooseneck structure together with springs 69 and 70. The weighted ends of the arms 71 and 72 provide means to normally hold the fulcrum arms 57 and 58 in fully retracted positions as they are shown in FIG. 1, such arms remaining in this position when springs 69 and 70 are disconnected upon the removal of harness H.

To prepare the trailer for loading and unloading while the trailer is in assembled and transportable position as in FIG. 4, the hook 10 of the winch cable 9 is connected with the eye 10a of the lug 10b carried at the point end of the tongue. The fifth wheel latch means is then released to permit withdrawal of the hitch pin 20 of the tongue 4 from the fifth wheel. Then by advancing the tractor 7 and releasing the winch cable 9, the forward end of the bed 2 is lowered to the ground as the gooseneck slides along the guide plates 81 away from the fifth wheel 5.

With the trailer on the ground and the front end of the gooseneck tongue retracted sufficiently to permit the weighted fulcrum arms to be rotated into contact with the roller 78 on the chassis 6, the harness H may be then brought into operative position by bringing the cable loop 61 toward the front of the tongue to place the hook 10 through the eye 62 and by then connecting springs 69 and 70 through the opening 62a in the rim portion of eye 62 and by hooking the other ends of the springs about the respective headed pins on the arm ends 71 and 72.

Springs 69 and 70 then act to hold the fulcrum arms 57 and 58 downwardly and outwardly below the bottom of the tongue as in FIG. 3, and cable loop 61 reacts against the anchor arms 52 and 53 that are now disposed in their upright positions with the harness attached in the manner best illustrated in FIG. 3.

The latching or locking mechanisms 42 may then be released and by a pull on cable 9 the fulcrum arms 57 and 58 are brought into seated abutment with the roller 78 to place the gooseneck under the control of the tractor and its winch cable. By tightening up on the cable 9 and by driving the tractor slowly rearwardly, the attaching portion 12 of the gooseneck can be appropriately moved to rotate the hook 37 out of engagement with the hook or latch bar 39 to allow the feet ends 23 and 24 of the frame sides 13 and 14 to releasably cam themselves out of the socket troughs at the top of the beams 28 and 29 of the bed. Thus, with the rearward and upward actuation of the gooseneck by means of cable 9 with the arms 57 and 58 having spaced abutting engagement with the transverse roller 78 on the tractor, the release of the gooseneck from the bed is readily accomplished.

While there may be a certain amount of latitude in the manipulations of the gooseneck, bed and tractor to bring about the separation or reattachment of the gooseneck with the bed, the above general procedure has proven to provide a satisfactory way of carrying out this function of the designed and cooperative mechanisms.

The procedure can then be easily reversed to cause the gooseneck to again be latched or connected with the bed and to bring the hook 37 into engagement under the bed bar 39, continued action rotating the side frame feet into the projecting bed beam sockets. When the gooseneck attaching section 12 is seated and the units are latched together by the hook and bar construction, the locking mechanisms can be operated to lock the units together for transportation.

It is to be understood that the looped cable such as 61 could be replaced with a V-shaped rod or the like in the form of a rigid member, but for the sake of storability, the cable is better adapted for stowage purposes as previously made apparent from the description of the operation of this latching gooseneck trailer.

Attention may also be directed to the use of a single hook such as 37 in a central position relatively to the bed with the seating units laterally positioned. With such an arrangement, it is conceivable that some horizontal misalignment may be compensated merely by the clearances and normal looseness that may exist between the coacting parts and mechanisms.

The modified construction shown in FIGS. 10 to 13 has been devised as one arrangement for accommodating greater horizontal misalignment between the gooseneck and bed structures of a composite trailer of the character herein disclosed. While a single latch hook could be readily employed, FIG. 10 illustrates a gooseneck 90 having side frames 91 and 92 including a cross frame member 93 that rigidly supports a pair of spaced latch hooks 94 and 95. These hooks are used to engage the bar 96 that is secured to the spaced beams 97 and 98 associated with the head end of the bed 99 of a trailer of the kind shown in FIG. 4. The gooseneck is otherwise not modified from the first described form of gooseneck.

In the modified construction, the projecting beams 97 and 98, and their connected bar 96 are all supported from a sturdy bearing plate 100 that includes a fixedly connected horizontal shaft 101 that is rotatably mounted in a sleeve bearing 102 secured to cross baffles or plates 103 and 104 at the head end of the bed 99. Preferably, pins 105 and 106 are fixed to the bed 99 and stop lugs 107 and 108 are on the plate 100 to limit the amount of free tilting of plate 100 as permitted through its shaft mounting. In this case, the side frames have bases 109 and 110 terminating in tapered feet 111 and 112 that coact with and seat into sockets 113 and 114 formed over the upper sides of the beams 97 and 98. Locking units such as 115 are here provided to hold the units in their connected relationship.

Feet 111 and 112 in FIGS. 10 and 13 illustrate the use of side panels on each foot such as shown at 116 and 117 to completely enclose the base ends 109 and 110 of the side frames 91 and 92. Rear wall 118 slopes downwardly and forwardly to aid in the angular approach of the gooseneck and its hook 94 in its manipulation for latching engagement with the bar 96 and subsequent seated union of the parts.

With the arrangement of a self-aligning mechanism illustrated in FIGS. 10 to 12 as a part of one of the latch means on one of the separable gooseneck and bed units, irregularity in the road or ground offers less alignment difficulty during attachment or detachment of the composite structures of such a trailer.

While the forms described have all been directed to fixed hook means in the latching mechanism, FIGS. 14 to 16 illustrate a somewhat different trailer construction employing certain other advantageous features in a separable tongue and trailer bed vehicle. The construction also employs dual latch means that occupy laterally spaced positions relatively to the trailer bed and such means function efficiently under misalignment.

In FIGS. 14 and 15, a trailer gooseneck 120 includes the side frames 121 and 122 having feet 123 and 124 that are adapted to seat upon the projecting beams 125 and 126 that each form an integral part of the trailer bed 127. The feet 123 and 124 each include tapered side edges 128—129 and 130—131. Each of the sloping edge pairs and their connected feet nest into sockets 132 and 133 formed by spaced rails 134 on beam 125 and by spaced rails 135 on the other beam 126. Each beam also has an upwardly and rearwardly sloping wall 136 to receive the coacting sloping wall 137 of each side frame 121 and 122. Locking devices 138 are used at the locations of the sloping walls 136 and 137 as in the other described forms of the invention to lock the separable gooseneck and bed units together.

The latching means of this modified construction incorporates side hooks 139 and 140 that swing transversely of the gooseneck on stub shafts 141 and 142 carried by the brackets 143 and 144 that are suitably secured to the gooseneck side frames 121 and 122. A bridge or cross brace 145 shown in FIG. 15 connects the side frames 121 and 122 at the hook bracket locations to contribute to the stability and sturdiness of the bed attaching section of the gooseneck.

A pair of latch bars 146 and 147 are welded or otherwise secured to the beams 125 and 126 to be engaged by the noses 148 and 149 of the side hooks 139 and 140. Reenforcing baffles on plates 150 and 151 are secured in inclined positions between the bars 146 and 147 and their adjacent top beam flanges 152 and 153 as best seen in FIGS. 14 and 15. Such baffles or plates serve to cam hooks 139 and 140 oppositely outwardly about their pivotal mountings as the gooseneck unit is brought downwardly upon the bed unit. The cam faces 154 and 155 of the hooks 139 and 140 engage such baffles and are then cammed outwardly over the bars 146 and 147 to drop into latching engagement with the beam bars as the side frame feet bottom in the bed beam sockets 132 and 133.

Hooks 139 and 140 can both be swung out and into generally vertical positions against the faces of the frame sides 121 and 122 as illustrated in the dot and dash outline to the right of FIG. 15. Suitable spring means is preferably used to hold the hooks upwardly out of operative positions and the same spring means can also be made to hold the hooks in their operative latched positions as shown in full lines in FIG. 15.

One form of such a spring means consists of a leaf spring 156 that is secured to the side frame 122 as in FIGS. 14 and 16 to present a flat end 157 against the circumferential surface of collar 158 that is secured to shaft 142. Collar 158 is made with flat reference faces 159 and 160 that are so oriented as to establish detent means in conjunction with the leaf spring 156 to releasably hold the associated hook 140 in the full line operative position in FIG. 16 or in the dot and dash line inoperative position shown in the same illustration.

In the latter described construction the gooseneck is otherwise made to include the same handling equipment as in the other constructions described. With the use of the harness means and the fulcrumed tongue on the tractor chassis, the latching structure shown in FIGS. 14 to 16 can be easily and efficiently manipulated and operated under the complete control of a tractor operator.

With the double latch arrangement occupying spaced positions in the transverse direction of the trailer, it is readily possible to accommodate some misalignment between the gooseneck and trailer bed during attachment or detachment of such units. One side can be fully latched or unlatched followed by a similar procedure at the other side of the associated units under proper gooseneck manipulation by the towing vehicle or tractor.

While the foregoing description has been directed more specifically to certain disclosed forms of the invention, other variations and modifications are considered possible without departing from the fundamental concept of the present invention. Any such changes in the individual elements or in their respective combination shall, however, be governed by the breadth and scope of the language appearing in the following claimed subject matter directed to a latching gooseneck trailer of the present invention.

What I claim is:

1. A trailer comprising gooseneck and bed units separable along adjacent meeting surfaces and cooperative means on said units for the selective attachment and separation of said units, said cooperative means comprising coacting orientation parts on said units arranged in juxtaposition between the adjacent meeting surfaces of said units, said orientation parts being provided with registering exterior surface configurations of complementary contours to orient and locate said units in a given operative relationship with respect to each other, and latch means to retain said units in their contacting oriented positions comprising a latch hook member fixedly carried on one of said units and a hook bar member fixedly carried on the other of said units.

2. A trailer comprising separable gooseneck and bed units, and cooperative means to attach and separate said units, said cooperative means comprising opposing contacting structural surface areas on said units including coacting orientation means on said opposing surface areas of said units per se, said surface areas being arranged in laterally spaced relation transversely of said trailer, and latch means to hold said opposing surface areas of said units together with said orientation means disposed in opeartive contacting relation therebetween, said latch means being connected with said units respectively and occupying positions disposed intermediate the locations of said laterally spaced orientation means.

3. A trailer comprising a towing unit, a load carrying unit, and attachment means to releasably connect said units, said attachment means comprising spaced downwardly directed feet forming supporting abutment elements on said towing unit, structural elements on said load carrying unit provided with depressed portions thereon to establish spaced upwardly open socket members on said load carrying unit to accommodate and support said feet in abutting engagement therein, and releasable latch means interposed between said units and connected with each to secure said units together and to maintain said feet operatively nested within said recessed socket members of the structural elements.

4. A trailer comprising a towing unit, a load carrying unit, and attachment means to releasably connect said units, said attachment means comprising spaced feet on said towing unit, spaced socket members on said load carrying unit to receive said feet, and releasable latch means interposed between said units and connected with each to secure said units together and to maintain said feet within said sockets, said feet and sockets consisting of elongated cooperative elements ararnged in a longitudinal direction with respect to said units, and said latch means providing operative latching parts disposed for latching engagement in a position located forwardly in relation to said longitudinal cooperative elements whereby the towing unit supports said load carrying bed in an offset relation to said cooperative elements that tends to urge the feet of said towing unit into greater seating contact within the sockets of the load carrying unit.

5. A trailer comprising a towing unit, a load carrying unit, and attachment means to releasably connect said units, said attachment means comprising spaced feet on said towing unit, spaced socket members on said load carrying unit to receive said feet, and releasable latch means interposed between said units and connected with each to secure said units together and to maintain said feet within said sockets, said latch means including coacting latch parts arranged for release by relative movement of said towing unit in a given direction with respect to said load carrying unit, and locking means for said units to operatively secure said units together to counteract relative motion between said units in said given direction for the separation of said latch parts.

6. A trailer comprising a towing unit, a load carrying unit, and attachment means to releasably connect said units, said attachment means comprising spaced feet formed on the lower terminal end portion of said towing unit, spaced upwardly open socket members on said load carrying unit to receive said feet, and releasable latch means interposed between said units and connected with each to secure said units together and to maintain said feet within said sockets, said socket members of said load carrying unit including sloping guide walls to direct said feet into seated relation within said sockets.

7. A trailer comprising a towing unit, a load carrying unit, and attachment means to releasably connect said units, said attachment means comprising spaced downwardly directed feet on said towing unit, spaced upwardly open socket members on said load carrying unit to receive said feet, and releasable latch means interposed between said units and connected with each to secure said units together and to maintain said feet within said sockets, said latch means including coacting latch parts that are operatively connected by relative movement of said towing unit in a given direction with respect to said load carrying unit, and said socket members including sloping guide walls to direct said towing unit in the aforesaid given direction to cause operative union of said latch parts.

8. A trailer comprising a towing unit, a load carrying unit, and attachment means to releasably connect said units, said attachment means comprising spaced feet on said towing unit, spaced socket members on said load carrying unit to receive said feet, and releasable latch means interposed between said units and connected with each to secure said units together and to maintain said feet within said sockets, said latch means including coacting latch parts that are operatively connected by relative movement of said towing unit in a given direction with respect to said load carrying unit, and said socket members including sloping guide walls to direct said towing unit in the aforesaid given direction to cause operative union of said latch parts, and releasable locking mechanism connected with said units respectively and functioning to counteract relative motion between said units to prevent accidental separation of said latch parts.

9. A trailer comprising a hitch tongue, a bed, coactive orientation and latching mechanisms to releasably secure said tongue to said bed, and cooperative means on said tongue to bodily move the latter in a given relation with respect to said bed to cause attachment of said tongue to said bed or the separation of the tongue from said bed through said orientation and latching mechanisms, said cooperative means comprising abutment members swingably connected with the outer towing end portion of said tongue, said abutment members being arranged to swing into positions exteriorly of said tongue to engage a structural part on a towing vehicle to position and to support said outer end portion of the tongue, and anchor members positioned rearwardly of said tongue and remote from the abutment members to receive a winch line from said towing vehicle whereby to raise or lower the entire tongue about the point of engagement of the abutment members with said towing vehicle structural part.

10. A trailer comprising a hitch tongue, a bed, coactive orientation and latching mechanisms to releasably secure said tongue to said bed, and cooperative means on said tongue to bodily move the latter in a given relation with respect to said bed to cause attachment of said tongue to said bed or the separation of the tongue from said bed by means of said orientation and latching mechanisms, said cooperative means comprising abutment members connected with the forward towing end portion of said tongue to engage a structural part on a towing vehicle to position and to support the forward towing end portion of the tongue, and anchor members positioned rearwardly on said tongue in positions remote from the abutment members to receive a winch line from said towing vehicle, pivotal means to swingably connect each of said abutment and anchor members to said tongue respectively, said pivotal means providing means to retract all of said members into stowed positions within the confines of said tongue structure and to permit said members to swing into operative outward positions with respect to said tongue.

11. A trailer comprising a hitch tongue, a bed, coactive orientation and latching mechanisms to releasably secure said tongue to said bed, and cooperative means on said tongue to bodily move the latter in a given relation with respect to said bed to cause attachment of said tongue to said bed or the separation of the tongue from said bed comprising abutment members connected with the outer towing end portion of said tongue to engage a structural part on a towing vehicle, and anchor members positioned rearwardly of said tongue for connection with a winch line from said towing vehicle, said tongue having pivotal means to support each of said members for limited swinging motion with respect to said tongue, and a harness to operatively connect all of said members for tongue manipulation comprising a tension unit connected with said anchor members including a connecting element to receive the winch line of said tractor, and spring means connected between said tension unit and said abutment members to normally urge the latter into operative positions with respect to said tongue.

12. In a trailer of the character set forth and defined in claim 10 with the addition of stop means on said tongue to automatically fix the members of said tongue in predetermined operative positions in relation to said tongue respectively.

13. A trailer comprising a hitch tongue, a bed, coactive orientation and latching mechanisms to releasably secure said tongue to said bed, and cooperative means on said tongue to bodily move the latter in a given relation with respect to said bed to cause attachment of said tongue to said bed or the separation of the tongue from said bed comprising abutment members connected with the outer towing end portion of said tongue to engage a structural part on a towing vehicle, and anchor members positioned rearwardly of said tongue for connection with a winch line from said towing vehicle, pivotal means to swingably connect each of said abutment and anchor members to said tongue respectively, said pivotal means providing means to retract all of said members into stowed positions within the confines of said tongue structure and to permit said members to swing into operative outward positions with respect to said tongue, and a harness to connect said swingable members comprising a looped cable structure connected with said anchor members and providing an eye to receive a hook from the winch line of the tractor, and spring units connected with the looped cable structure and having connection with said abutment members to normally urge the latter to swing into their respective operative positions with respect to said tongue.

14. A trailer comprising a hitch tongue, a bed, coactive orientaion and latching mechanisms to releasably secure said tongue to said bed, and cooperative means on said tongue to bodily move the latter in a given relation with respect to said bed to cause attachment of said tongue to said bed or the separation of the tongue from said bed comprising abutment members connected with the outer towing end portion of said tongue to engage a structural part on a towing vehicle, and anchor members positioned rearwardly of said tongue for connection with a winch line from said towing vehicle, said hitch tongue having a bearing plate and a hitch pin thereon for operative connection with a fifth wheel on said towing vehicle, and said abutment members being arranged to occupy laterally spaced positions above the level of the bearing plate, and pivotal connecting said abutment members with said tongue to permit said members to move into positions extending below the level of said bearing plate upon separation of said hitch pin from the fifth wheel of the towing vehicle and upon displacement of said tongue to a position rearwardly with respect to said fifth wheel, said extended abutment members providing means for spaced engagement with said structural part of said towing vehicle to laterally stabilize the tongue and to permit limited vertical rocking of said tongue about said structural part.

15. A trailer comprising a gooseneck, a bed, said gooseneck having spaced side frames terminating in downwardly directed tapered feet, said bed having spaced projections thereon providing upwardly open sockets for the reception of said tapered feet, and cooperative latch means connected with said gooseneck and bed respectively to releasably secure said gooseneck to said bed and to retain said feet in operative oriented and nested engagement within said sockets.

16. In a trailer as in claim 15 wherein said latch means comprises a hook connected with said gooseneck and arranged to depend into the space between said bed projections, and a hook bar connected between said bed projections to operatively receive said hook in latching engagement therewith.

17. A vehicular trailer comprising, in combination, a trailer bed, a gooseneck for said bed, said bed having structural parts thereon to provide supporting surfaces to receive said gooseneck thereagainst, said gooseneck having a downwardly directed attachment section thereon to seat upon and in contact with said structural parts of said bed, said gooseneck and bed being separable to facilitate the loading and unloading of said bed, and cooperative means for said gooseneck and bed to releasably secure the attachment section of the gooseneck to the bed, said cooperative means comprising feet disposed under the bed contacting portion of said attachment section of the gooseneck, said bed providing socket means within said bed parts and located underneath said attachment section to accommodate the feet of said section therein, and latch mechanism comprising coacting elements rigidly connected with said attachment section of the gooseneck and with said bed respectively, said coacting elements being arranged to operatively hold said gooseneck firmly seated in relation to said bed, with the feet of said attachment section nested in oriented relation within the confines of the socket means of the structural bed parts.

18. A vehicular trailer comprising, in combination, a trailer bed, a gooseneck for said bed, said bed having structural parts thereon to provide supporting surfaces to receive said gooseneck thereagainst, said gooseneck having a downwardly directed attachment section thereon to seat upon and in contact with said structural parts of said bed, said gooseneck and bed being separable to facilitate the loading and unloading of said bed, and cooperative means for said gooseneck and bed to releasably secure the attachment section of the gooseneck to the bed, said cooperative means comprising feet disposed under the bed contacting portion of said attachment section of the gooseneck, said bed providing socket means within said bed parts and located underneath said attachment section to accommodate the feet of said section therein, and latch mechanism comprising coacting elements rigidly connected with said attachment section of the gooseneck and with said bed respectively, said coacting elements being arranged to operatively hold said gooseneck firmly seated in relation to said bed, with the feet of said attachment section nested in oriented relation within the confines of the socket means of the structural bed parts, said structural parts of the bed occupying positions at one level and being laterally spaced in relation to the bed width to provide spaced socket means for the part locations, said attachment section providing similarly spaced feet thereunder to engage into the sockets at the designated level, and said coacting elements of said latch mechanism occupying a position at another level located below the aforesaid orientation means to counteract upward separation thereof and to establish lateral stability between the joined gooseneck and bed.

19. A vehicular trailer comprising, in combination, a trailer bed, a gooseneck for said bed, said bed having structural parts thereon to provide supporting surfaces to receive said gooseneck thereagainst, said gooseneck having a downwardly directed attachment section thereon to seat upon and in contact with said structural parts of said bed, said gooseneck and bed being separable to facilitate the loading and unloading of said bed, and cooperative means for said gooseneck and bed to releasably secure the attachment section of the gooseneck to the bed, said cooperative means comprising feet disposed under the bed contacting portion of said attachment section of the gooseneck, said bed providing socket means within said bed parts and located underneath said attachment section to accommodate the feet of said section therein, and latch mechanism comprising coacting elements rigidly connected with said attachment section of the gooseneck and with said bed respectively, said coacting elements being arranged to operatively hold said gooseneck firmly seated in relation to said bed, with the feet of said attachment section nested in oriented relation within the confines of the socket means of the structural bed parts, said structural part socket means being upwardly and forwardly open, and said coacting elements of said latch mechanism being disposed beneath and to the forward region of the union of the attachment section feet in said socket means to permit forward fulcruming of the gooseneck in relation to the bed to swing the feet free of the socket means for gooseneck separation during disengagement of the coacting elements of said latch mechanism.

20. A gooseneck drawbar adapted to be connected between the forward end of a trailer and the fifth wheel of a tractor having an inclined ramp extending from the fifth wheel downwardly toward the rear of the tractor, a winch mounted forwardly of the fifth wheel, and a cable on the winch having a hook member on the end thereof, said drawbar comprising, a pair of parallel, longitudinally extending structural members, lateral members rigidly interconnecting said pair of structural members, a lever arm pivotably mounted on the forward portion of one of said pair of structural members, said lever arm adapted to be pivoted into anchored engagement with the tractor ramp whereby to provide a fulcrum at the forward end of the gooseneck drawbar about which the rear end thereof may be pivotably raised and lowered, hook receiving means carried on one of said pair of structural members rearwardly of the pivotably mounted lever arm and adapted to receive the hook member on the end of the cable whereby actuation of the winch acts to pivotably raise and lower the rear end of the gooseneck drawbar when the forward end thereof is anchored to the tractor ramp, and means connecting said lever arm to the cable whereby when the slack in the cable is taken up the lever member is automatically pivoted into said anchored engagement with the tractor ramp.

21. A trailer comprising a hitch tongue unit, a bed unit, and detachable mechanisms operatively connecting the coupled portions of said units together, said detachable mechanisms comprising coacting orientation members provided on meeting surfaces of said units respectively together with coacting latch parts connected with said coupled portions of said units respectively to provide latched retention of said units to one another by means of said orientation members, one of said units being further provided with connected swingable supporting means interposed between said one unit and the orientation members, and latch part of that unit to carry such members and part in adjustable relation with respect to the corresponding orientation members and latch part of said other unit, such swingable supporting means providing limited adjustable regulation between said coacting members and coacting parts while joining said units to compensate for misalignment between such units during the coupling operation.

22. A trailer comprising a gooseneck, a bed, said gooseneck having spaced side frames terminating in tapered feet, said bed having spaced projections thereon providing sockets for the reception of said tapered feet, and cooperative latch means connected with said gooseneck and bed respectively to releasably secure said gooseneck to said bed and to retain said feet in nested engagement within said sockets, said latch means being disposed at opposite outward sides of said side frames and each of said means comprising an edgewise swingable hook on the adjacent side frame coacting with a latch bar secured upon an adjacent face of the bed projection to receive said coacting hook in latching engagement thereunder and in close proximity to the adjacent face portion of said bed projection.

23. A trailer comprising a gooseneck, a bed, said gooseneck having spaced side frames terminating in tapered feet, said bed having spaced projections thereon providing sockets for the reception of said tapered feet, and cooperative latch means connected with said gooseneck and bed respectively to releasably secure said gooseneck to said bed and to retain said feet in nested engagement within said sockets, said latch means being disposed at opposite outward sides of said side frames and each of said means comprising an edgewise swingable hook on the adjacent side frame coacting with a latch bar secured upon an adjacent face of the bed projection to receive said coacting hook in latching engagement thereunder and in close proximity to the adjacent face portion of said bed projection, each of said latch means including spring detent mechanism for said hook comprising coacting elements providing cooperative reference surfaces thereon to releasably position said hook in an operative latching relation when disposed in one location as determined by one set of reference surfaces and to releasably position said hook in an inoperative nonlatching position when disposed in another location as determined by another set of said reference surfaces.

References Cited in the file of this patent

UNITED STATES PATENTS

| | | |
|---|---|---|
| 2,325,869 | Mosling | Aug. 3, 1943 |
| 2,489,112 | Talbert | Nov. 22, 1949 |
| 2,545,584 | Meadows | Mar. 20, 1951 |
| 2,722,433 | Shinn | Nov. 1, 1955 |
| 2,822,945 | Duffy | Feb. 11, 1958 |
| 2,907,581 | Talbert | Oct. 6, 1959 |
| 2,944,834 | Hill | July 12, 1960 |
| 2,968,412 | Hill | Jan. 17, 1961 |